US008623936B2

(12) United States Patent
Roddy et al.

(10) Patent No.: US 8,623,936 B2
(45) Date of Patent: *Jan. 7, 2014

(54) WEIGHTED ELASTOMERS, CEMENT COMPOSITIONS COMPRISING WEIGHTED ELASTOMERS, AND METHODS OF USE

(75) Inventors: Craig W. Roddy, Duncan, OK (US);
Jeffery D. Karcher, Duncan, OK (US);
Rickey L. Morgan, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 3174 days.

This patent is subject to a terminal disclaimer.

(21) Appl. No.: 12/511,793

(22) Filed: Jul. 29, 2009

(65) Prior Publication Data
US 2011/0028593 A1 Feb. 3, 2011

(51) Int. Cl.
| C09K 8/00 | (2006.01) |
| C04B 7/00 | (2006.01) |
| C04B 28/00 | (2006.01) |
| C04B 7/32 | (2006.01) |
| C04B 28/06 | (2006.01) |
| C04B 9/12 | (2006.01) |
| C04B 28/04 | (2006.01) |
| C04B 16/00 | (2006.01) |
| C04B 24/00 | (2006.01) |
| E21B 33/00 | (2006.01) |

(52) U.S. Cl.
USPC ........... 523/130; 106/638; 106/692; 106/713; 106/802; 166/285

(58) Field of Classification Search
USPC ........... 523/130; 166/285; 106/638, 692, 713, 106/802
See application file for complete search history.

(56) References Cited

U.S. PATENT DOCUMENTS

| 2,995,514 | A | 8/1961 | Jordan et al. |
| 3,362,837 | A | 1/1968 | Walker |
| 5,478,391 | A | 12/1995 | Babaev et al. |
| 6,508,305 | B1 * | 1/2003 | Brannon et al. ............... 166/293 |
| 6,645,288 | B1 | 11/2003 | Dargaud et al. |
| 6,902,001 | B2 | 6/2005 | Dargaud et al. |
| 7,261,156 | B2 | 8/2007 | Nguyen et al. |
| 7,261,157 | B2 | 8/2007 | Nguyen et al. |
| 7,264,051 | B2 | 9/2007 | Nguyen et al. |

(Continued)

FOREIGN PATENT DOCUMENTS

| WO | WO 2006085012 A1 * | 8/2006 | ............... C04B 28/08 |
| WO | WO 2007/149781 | 12/2007 | |

OTHER PUBLICATIONS

PCT International Search Report and Written Opinion for International Application No. PCT/GB2010/001437 dated Feb. 24, 2011.
HES Brochure entitled "Hi-Dense Weight Additives", 1998.

(Continued)

*Primary Examiner* — Peter F Godenschwager
*Assistant Examiner* — David Karst
(74) *Attorney, Agent, or Firm* — Craig W. Roddy; Tumey L.L.P.

(57) ABSTRACT

Methods and compositions are provided that relate to weighted elastomers. The weighted elastomers may comprise an elastomer and a weighting agent attached to an outer surface of the elastomer. An embodiment includes a method of cementing that comprises providing a cement composition containing cement, water, and a weighted elastomer. In addition, the cement composition may be introduced into a subterranean formation and allowed to set therein.

38 Claims, 1 Drawing Sheet

(56) References Cited

U.S. PATENT DOCUMENTS

| | | |
|---|---|---|
| 7,267,174 B2 | 9/2007 | Gonsveld et al. |
| 7,273,099 B2 | 9/2007 | East et al. |
| 7,350,571 B2 | 4/2008 | Nguyen et al. |
| 7,650,940 B2 | 1/2010 | Reddy |
| 2004/0171499 A1 | 9/2004 | Ravi et al. |
| 2005/0113262 A1 | 5/2005 | Ravi et al. |
| 2006/0096759 A1 | 5/2006 | Reddy et al. |
| 2006/0175060 A1 | 8/2006 | Reddy |
| 2007/0044963 A1 | 3/2007 | MacDougall |
| 2007/0137528 A1 | 6/2007 | Le Roy-Delage et al. |
| 2007/0151730 A1 | 7/2007 | Reddy |
| 2007/0204992 A1* | 9/2007 | Davis et al. ............... 166/280.2 |
| 2008/0017376 A1 | 1/2008 | Badalamenti et al. |
| 2008/0099203 A1 | 5/2008 | Mueller et al. |
| 2008/0108524 A1 | 5/2008 | Willberg et al. |
| 2008/0135250 A1 | 6/2008 | Bosma et al. |
| 2008/0261834 A1* | 10/2008 | Simon ............................ 507/221 |
| 2009/0071650 A1 | 3/2009 | Roddy et al. |
| 2009/0088348 A1 | 4/2009 | Roddy et al. |
| 2009/0095475 A1 | 4/2009 | Ravi et al. |
| 2009/0176667 A1 | 7/2009 | Nguyen |
| 2009/0308611 A1 | 12/2009 | Santra et al. |
| 2011/0028594 A1 | 2/2011 | Roddy |
| 2011/0112211 A1* | 5/2011 | Audibert et al. ............... 523/130 |
| 2012/0172261 A1 | 7/2012 | Roddy |
| 2012/0172518 A1 | 7/2012 | Roddy |

OTHER PUBLICATIONS

HES Brochure entitled "Cementing SSA-1 Cement Additive", 2006.
HES Brochure entitled "Cementing CFR-3 Cement Friction Reducer", 2005.
HES Brochure entitled "WellLife III Cementing Service", Apr. 2008.
PCT International Search Report and Written Opinion for International Application No. PCT/GB2011/000941 dated Dec. 5, 2011.
USPTO Office Action for U.S. Appl. No. 13/418,257 dated Dec. 3, 2012.
Office Action for U.S. Appl. No. 13/418,267 dated Mar. 7, 2013.
USPTO Office Action for U.S. Appl. No. 12/821,514 dated Mar. 23, 2012.
USPTO Office Action for U.S. Appl. No. 13/418,257 dated Jun. 21, 2012.
USPTO Office Action for U.S. Appl. No. 12/821,514 dated Aug. 23, 2012.
USPTO Office Action for U.S. Appl. No. 13/418,267 dated Oct. 5, 2012.
Office Action for U.S. Appl. No. 12/821,514 dated Feb. 1, 2013.
International Preliminary Report on Patentability and Written Opinion on PCT/GB2011/000941 dated Dec. 28, 2012.
USPTO Notice of Allowance for U.S. Appl. No. 12/821,514 dated Apr. 5, 2013.
USPTO Office Action for U.S. Appl. No. 13/418,257 dated Apr. 23, 2013.

* cited by examiner

WEIGHTED ELASTOMERS, CEMENT COMPOSITIONS COMPRISING WEIGHTED ELASTOMERS, AND METHODS OF USE

BACKGROUND

The present invention relates to weighted elastomers and, more particularly, in certain embodiments, to weighted elastomers, cement compositions comprising weighted elastomers, and methods of using weighted elastomers in cementing operations.

Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string should function to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

Elastomers are one additive that may be included in a cement composition. Among other reasons, elastomers may be included in a cement composition to improve the mechanical properties of the set cement composition. For example, elastomers may be included in a cement composition to improve the elasticity and ductility of the set cement composition, thereby potentially counteracting possible stresses that may be encountered by the cement composition in a well bore. In some instances, elastomers that swell upon contact with water and/or oil may be used. These swellable elastomers may help maintain zonal isolation, for example, by swelling when contacted by oil and/or water to seal cracks in the cement sheath and/or micro-annulus between the cement sheath and the pipe string or formation that may be created.

Weighting agents also may be included in the cement compositions to increase the density of the cement composition. A cement composition having an increased density may be desirable, for example, in deep wells where high pressure may be encountered. Examples of weighting agents that may be used include, but are not limited to, hematite, hausmannite, barite, and sand.

A problem often encountered when both elastomers and weighting agents are included in a cement composition is that the elastomers and weighting agents tend to segregate in different areas of the cement composition. For example, the weighting agents generally tend to sink while the elastomers tend to float, which can leave certain areas with little or no weighting agent and other areas with little or no elastomer. As a result, the cement composition may not have a uniform density distribution when introduced into the formation, resulting in a potential for the design specifications of the cement composition to not be met. To prevent this undesired segregation, great care is often taken in formulating cement compositions that comprise both elastomers and weighting agents. This may result in added expense and complexity due to, among other things, a need for additional additives and monitoring.

SUMMARY

The present invention relates to weighted elastomers and, more particularly, in certain embodiments, to weighted elastomers, cement compositions comprising weighted elastomers, and methods of using weighted elastomers in cementing operations.

An embodiment of the present invention may comprise a weighted elastomer. The weighted elastomer may comprise an elastomer and a weighting agent attached to an outer surface of the elastomer. The weighted elastomer may have a specific gravity of at least about 1.1.

Another embodiment of the present invention may comprise a cement composition. The cement composition may comprise cement, water, and a weighted elastomer. The weighted elastomer may comprise an elastomer and a weighting agent attached to an outer surface of the elastomer.

Another embodiment of the present invention provides a method of cementing. The method of cementing may comprise providing a cement composition that comprises cement, water, and a weighted elastomer. The weighted elastomer may comprise an elastomer and a weighting agent attached to an outer surface of the elastomer. The method of cementing further may comprise allowing the cement composition to set.

Yet another embodiment of the present invention provides a method that may comprise providing a fluid that comprises a weighted elastomer. The weighted elastomer may comprise an elastomer and a weighting agent attached to an outer surface of the elastomer. The method further may comprise introducing the fluid into a subterranean formation.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

The present invention relates to weighted elastomers and, more particularly, in certain embodiments, to weighted elastomers, cement compositions comprising weighted elastomers, and methods of using weighted elastomers in cementing operations. As used herein, the term "weighted elastomer" refers to an elastomer that has been weighted to have a specific gravity of at least about 1.1. One of the many potential advantages of the methods and compositions of the present invention may be that the inclusion of the weighted elastomer in embodiments of the cement compositions may reduce problems associated with segregation, especially when used in combination with weighting agents, as only the need to address additives with specific gravities greater than water may be needed.

An embodiment of the cement compositions of the present invention comprises cement, water, and a weighted elastomer that comprises an elastomer and a weighted agent attached to an outer surface of the elastomer. In certain embodiments, the cement compositions further may comprise a weighting agent. Those of ordinary skill in the art will appreciate that embodiments of the cement compositions generally should have a density suitable for a particular application. By way of example, embodiments of the cement compositions may have a density of about 4 pounds per gallon ("lb/gal") to about 20 lb/gal. In certain embodiments, the cement compositions may have a density of about 8 lb/gal to about 17 lb/gal. In certain embodiments, the cement composition may be a heavyweight cement composition having a density of at least about 14 lb/gal. Those of ordinary skill in the art, with the benefit of this disclosure, will recognize the appropriate density for a particular application.

Hydraulic cement is a component that may be included in embodiments of the cement compositions of the present invention. Any of a variety of hydraulic cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain embodiments, the hydraulic cement may comprise a Portland cement. The Portland cements that may be suited for use in embodiments of the present invention are classified as Class A, C, G and H cements according to American Petroleum Institute, API Specification for Materials and Testing for Well Cements, API Specification 10, Fifth Ed., Jul. 1, 1990. In addition, in some embodiments, hydraulic cements suitable for use in the present invention may include cements classified as ASTM Type I, II, or III.

The water used in embodiments of the cement compositions of the present invention may include, for example, freshwater, saltwater (e.g., water containing one or more salts dissolved therein), brine (e.g., saturated saltwater produced from subterranean formations), seawater, or combinations thereof. Generally, the water may be from any source, provided, for example, that it does not contain an excess of compounds that may undesirably affect other components in the cement composition. In some embodiments, the water may be included in an amount sufficient to form a pumpable slurry. In some embodiments, the water may be included in the cement compositions of the present invention in an amount of about 40% to about 200% by dry weight of cementitious components ("bwoc"). In some embodiments, the water may be included in an amount of about 40% to about 150% bwoc.

Figure 1:
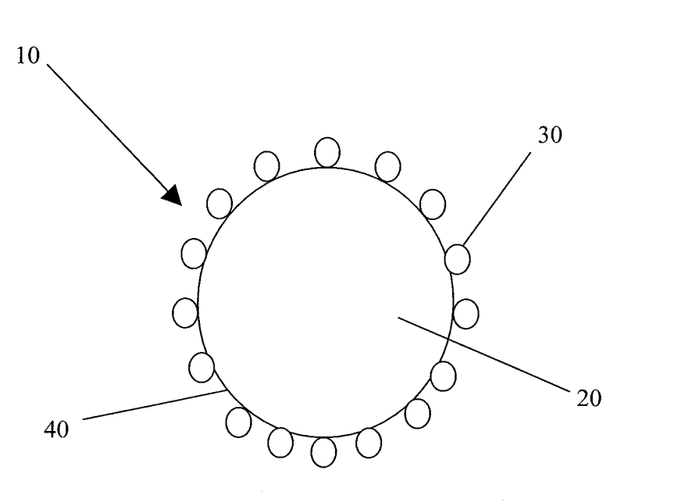
FIG. 1 is an illustration of a weighted elastomer in accordance with one embodiment of the present invention.

A weighted elastomer may be included in embodiments of the cement compositions of the present invention. The weighted elastomer may comprise, for example, an elastomer and a weighted agent attached to an outer surface of the elastomer. As illustrated in FIG. 1, weighted elastomer 10 may comprise elastomer 20 and weighting agent 30 attached to an outer surface 40 of the elastomer, in embodiments of the present invention. The weighted elastomer is generally heavier than elastomers that have been used heretofore, in that the weighted elastomer has been weighted to a specific gravity of at least about 1.1. Of their many potential advantages, one such advantage of using the weighted elastomer is that segregation issues associated with using elastomers may be reduced or even eliminated. For example, when using the weighted elastomer in combination with a weighting agent, problems associated with using an elastomer that floats and a weighting agent that sinks should generally be avoided.

The weighted elastomer may be added to embodiments of the cement composition by dry blending with the cement before the addition of the water, by mixing with the water to be added to the cement, or by mixing with the cement composition consecutively with or after the addition of the water. Moreover, the weighted elastomer may be included in embodiments of the cement compositions in an amount desired for a particular application. In some embodiments, the weighted elastomer may be present in an amount of about 0.1% to about 100% bwoc (e.g., about 1%, about 5%, about 10%, about 20%, about 30%, about 40%, about 50%, about 60%, about 70%, about 80%, about 90%, etc.). In certain embodiments, the weighted elastomer may be present in an amount of about 1% to about 30% bwoc and, alternatively, in an amount of about 5% to about 25% bwoc.

Any of a variety of elastomers may be weighted to form the weighted elastomers in accordance with embodiments of the present invention. Generally, the elastomers may be used in particulate form. As used herein, the term "particulate" refers to materials in solid state having a well-defined physical shape as well as those with irregular geometries, including any particulates elastomers having the physical shape of platelets, shavings, fibers, flakes, ribbons, rods, strips, spheroids, hollow beads, toroids, pellets, tablets, or any other physical shape. Examples of suitable elastomers, include, but are not limited to, polypropylene, polyethylene, styrene divinyl benzene, polyisoprene, polybutadiene, polyisobutylene, polyurethane, styrene-butadiene random and block copolymers, acrylonitrile-butadiene, and acrylonitrile-styrene-butadiene.

In certain embodiments, the elastomer may be a swellable elastomer. As used herein, an elastomer is characterized as swellable when it swells upon contact with oil and/or swells upon contact with aqueous fluids. By way of example, the elastomer may be an oil-swellable elastomer that it swells upon contact with any of a variety of oils, such as crude oil, diesel oil, kerosene and the like, as well as, oil-based fluids and gas or liquid hydrocarbons located in subterranean formations. By way of further example, the elastomer may be a water-swellable elastomer that swells upon contact with aqueous fluids, such as fresh water, salt water and the like, as well as, water-based fluids and aqueous fluids located in subterranean formations. Among other things, use of a swellable elastomer in embodiments of the cement compositions may help maintain zonal isolation, for example, by swelling when contacted by oil and/or aqueous fluids to seal cracks in the cement sheath and/or micro-annulus between the cement sheath and the pipe string or formation that may be created.

Swellable elastomers suitable for use in embodiments of the cement compositions may generally swell by up to about 500% of their original size at the surface. Under downhole conditions, this swelling may be more or less depending on the conditions presented. For example, the swelling may be at least 10% at downhole conditions. In some embodiments, the swelling may be up to about 200% under downhole conditions. However, as those of ordinary skill in the art, with the benefit of this disclosure, will appreciate, the actual swelling when the swellable elastomer is included in a cement composition may vary, for example, based on the concentration of the swellable elastomer included in the cement composition and the amount of oil and/or aqueous fluid present, among other factors.

Oil-swellable elastomers that should be used in embodiments of the weighted elastomer include any of a variety of materials that swell upon contact with oil. Some specific examples of suitable oil-swellable elastomers include, but are not limited to, natural rubber, polyurethane rubber, nitrile rubber, hydrogenated nitrile rubber, acrylate butadiene rubber, polyacrylate rubber, butyl rubber, brominated butyl rubber, chlorinated butyl rubber, chlorinated polyethylene rubber, isoprene rubber, choloroprene rubber, neoprene rubber, butadiene rubber, styrene butadiene copolymer rubber, sulphonated polyethylene, ethylene acrylate rubber, epichlorohydrin ethylene oxide copolymer rubber, ethylene-propylene-copolymer (peroxide cross-linked), ethylene-propylene-copolymer (sulphur cross-linked), ethylene-propylene-diene terpolymer rubber, ethylene vinyl acetate copolymer, fluoro rubbers, fluoro silicone rubbers, silicone rubbers, poly 2,2,1-bicyclo heptene (polynorborneane), alkylstyrene, and crosslinked substituted vinyl acrylate copolymers. Combinations of oil-swellable elastomers may also be used. Other elastomers that behave in a similar fashion with respect to oil also may be suitable. Those of ordinary skill in the art, with the benefit of this disclosure, will be able to select an appropriate oil-swellable elastomer for use in the compositions of the present invention based on a variety of factors, including the application in which the composition will be used and the desired swelling characteristics.

Water-swellable elastomers that should be used in embodiments of the weighted elastomer include any of a variety of materials that swell upon contact with water. Some specific examples of water-swellable elastomers include, but are not limited to, super-absorbent polymers (such as polymethacrylate and polyacrylamide) and non-soluble acrylic polymers (such as starch-polyacrylate acid graft copolymer and salts thereof), polyethylene oxide polymers, carboxymethyl cellulose type polymers, poly(acrylic acid) and salts thereof, poly(acrylic-co-acrylamide) and salts thereof, graft-poly(ethylene oxide) of poly(acrylic acid) and salts thereof, poly(2-hydroxyethyl methacrylate), poly(2-hydroxypropyl methacrylate), polyvinyl alcohol cyclic acid anhydride graft copolymer, isobutylene maleic anhydride, vinylacetate-acrylate copolymer, and starch-polyacrylonitrile graft copolymers. Combinations of water-swellable elastomers may also be suitable. Other elastomers that behave in a similar fashion with respect to aqueous fluids also may be suitable. Those of ordinary skill in the art, with the benefit of this disclosure, will be able to select an appropriate water-swellable elastomer for use in the compositions of the present invention based on a variety of factors, including the application in which the composition will be used and the desired swelling characteristics.

Embodiments of the swellable elastomers may be dual oil/water swellable, in that the elastomer may comprise a combination or mixture of both oil-swellable and water-swellable materials. A particle is characterized as "dual oil/water-swellable" when it swells upon contact with oil and also swells upon contact with aqueous fluids. In accordance with embodiments of the present invention, the oil-swellable material and/or the water-swellable material may comprise an elastomer. By way of example, the swellable elastomer may comprise an ethylene-propylene polymer (e.g., ethylene-propylene copolymer rubber or ethylene-propylene-diene terpolymer rubber) and bentonite. By way of further example, the swellable elastomer may comprise a butyl rubber and sodium bentonite.

As previously described, the weighted elastomer is an elastomer that has been weighted to have a specific gravity of at least about 1.1 (e.g., about 1.5, about 2, about 2.5, about 3, about 3.5, about 4, about 4.5, about 5). Alternatively, the elastomer may be weighted to have a specific gravity of at least about 2, at least about 3, or at least about 4. One of ordinary skill in the art will be able to recognize a suitable specific gravity of the weighted elastomer for a particular application.

An example of a suitable weighted elastomer may comprise an elastomer and a weighting agent attached to an outer surface of the elastomer. By way of example, a plurality of particles of the weighting agent may be attached to the outer surface of the elastomer. Weighting agents are typically materials that weigh more than water and may be used to increase the density of a cement composition. By way of example, weighting agents may have a specific gravity of at least 2 (e.g., about 2, about 4, etc.). Examples of weighting agents that may be used include, but are not limited to, hematite, hausmannite, barite, sand (e.g., silica flour), cement, and combinations thereof. Specific examples of suitable weighting agents include HI-DENSE® weighting agent, available from Halliburton Energy Services, Inc., and SSA-1™ cement additive, available from Halliburton Energy Services, Inc.

The amount of the weighting agent used in embodiments of the weighted elastomers generally may depend on a number of factors, including the particular elastomer, the desired specific gravity for the elastomer, the particular weighting agent, and the specific end-use application. In certain embodiments, the weighted elastomer may have a weight ratio of the weighting agent to the elastomer of about 99:1 to about 0.1:1 and, alternatively, a weight ratio of about 3:1 to about 1:1.

The weighting agent generally may have a particle size that is smaller than the particle size of the elastomer. By way of example, the weighting agent may have a particle size that is less than or equal to about 50% of the particle size of the elastomer. In certain embodiments, the weighting agent may have a particle size that is less than or equal to about 10% of the particle size of the elastomer and, alternatively, less than or equal to about 5% of the particle size of the elastomer.

While the weighting agent may be attached to the outer surface of the elastomer, the weight agent generally should not fully coat the elastomer in certain embodiments of the present invention. In other words, at least a portion of the surface of the elastomer should remain uncovered, in certain embodiments, after attachment of the weighting attachment. This may be desirable, for example, so that the elastomer (e.g., a swellable elastomer) can come into contact with fluids after placement into a well bore. In certain embodiments, at least about 1% to about 99% (e.g., about 5%, about 10%, about 25%, about 50%, about 75%, etc.) of the surface of the elastomer portion of the weighted elastomer may be uncovered.

The weighting agent may be attached to the elastomer using any suitable technique. By way of example, the weighting agent may be attached to the outer surface of the elastomer with an adhesive. Any of a variety of adhesive that can adhere to the weighting agent to the outer surface of the elastomer may be suitable. Examples of suitable adhesives may include, but are not limited to, water-based acrylic paints, oil-based paints, and oil-based primers.

A variety of techniques may be used for attaching the weighting agent to the elastomer with an adhesive. For example, the elastomer may first be mixed with the adhesive to at least partially coat the elastomer with the adhesive. This mixture may then be passed through a sieve to remove large pieces of the elastomer. The weighting agent may then be combined with this mixture such that the adhesive attaches the weighting agent to the outer surface of the elastomer. In another embodiment, the weighting agent (rather than the elastomer) may first be mixed with the adhesive to at least partially coat the weighting agent with the adhesive. The elastomer may then be combined with this mixture such that the adhesive attaches the weighting agent to the outer surface of the elastomer. Thereafter, the mixture may be passed through a sieve to remove large pieces. If desired, additional weighting material may then be added to the mixture.

While embodiments may provide for attaching a weighting agent to the elastomer, one or more additional weighting agents may be included in embodiments of the cement compositions of the present invention. It should be understood that this weighting agent is separate from, and may be the same or different than, the weighting agent that may be attached to the elastomer. As previously described, weighting agents are typically materials that weigh more than water and may be used to increase the density of a cement composition. By way of example, weighting agents may have a specific gravity of at least 2 (e.g., about 2, about 4, etc.). Examples of weighting agents that may be used include, but are not limited to, hematite, hausmannite, barite, sand (e.g., silica flour), cement, and combinations thereof. Specific examples of suitable weighting agents include HI-DENSE® weighting agent, available from Halliburton Energy Services, Inc., and SSA-1™ cement additive, available from Halliburton Energy Services, Inc.

The weighting agent may be added to embodiments of the cement composition by dry blending with the cement before the addition of the water, by mixing with the water to be added to the cement, or by mixing with the cement composition consecutively with or after the addition of the water. Where used, the weighting agent may be included in the cement composition in an amount sufficient to, for example, provide the desired density. By way of example, the weighting agent may be included in an amount of about 0.1% to about 150% bwoc, alternatively, in an amount of about 10% to about 70% bwoc, and alternatively, in an amount of about 15% to about 50% bwoc.

Other additives suitable for use in subterranean cementing operations also may be added to embodiments of the cement compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, cement kiln dust, lime, resins, latex, combinations thereof, and the like. A person having ordinary skill in the art, with the benefit of this disclosure, will readily be able to determine the type and amount of additive useful for a particular application and desired result.

In accordance with embodiments of the present invention, a method of the present invention may comprise providing a cement composition comprising cement, water, and a weighted elastomer, and allowing the cement composition to set. As will be appreciated, the cement composition may be allowed to set in any suitable location where it may be desired for the cement composition to set into a hardened mass. By way of example, the cement composition may be allowed to set in a variety of locations, both above and below ground.

Additionally, embodiments of the cement compositions of the present invention may be used in a variety of subterranean applications where cement compositions may be used, including, but not limited to, primary cementing, remedial cementing, and drilling operations. An example of a method of the present invention may comprise introducing a cement composition that comprises cement, water, and a weighted elastomer into a subterranean formation; and allowing the cement composition to set in the subterranean formation. As desired by one of ordinary skill in the art, with the benefit of this disclosure, embodiments of the cement compositions of the present invention useful in this method may comprise any of the above-listed additives, as well any of a variety of other additives suitable for use in subterranean application. In example primary cementing embodiments, a cement composition may be introduced into a space between a subterranean formation and a conduit (e.g., casing, expandable casing, liners, etc.) located in the subterranean formation. The cement composition may be allowed to set to form a hardened mass in the space between the subterranean formation and the conduit. Generally, in most instances, the hardened mass should fix the conduit in the formation. The method further may comprise, for example, introducing the conduit into the subterranean formation. In addition, in example remedial cementing embodiments, a cement composition may used, for example, in squeeze cementing operations (e.g., to seal voids and/or holes in the formation, cement sheath, and/or a pipe) or in the placement of cement plugs.

While the preceding discussion is directed to the use of a weighted elastomer in cementing methods, those of ordinary skill in the art will appreciate that the present technique also encompasses the use of weighted elastomers in a variety of different subterranean treatments, including drilling fluids, completing fluids, stimulation fluids, spacer fluids, and well clean-up fluids. In accordance with one embodiment, a weighted elastomer may be included in a spacer fluid. For example, a spacer fluid may be placed between two fluids contained in or to be pumped within a well bore. Examples of fluids between which spacer fluids are utilized include between cement compositions, and drilling fluids, between different drilling fluids during drilling fluid change outs and between drilling fluids and completion brines. Among other things, spacer fluids may be used to enhance drilling fluid and filter cake removal from the walls of well bores, to enhance displacement efficiency and to physically separate chemically incompatible fluids. For example, a hydraulic cement composition and a drilling fluid may be separated by a spacer fluid when the cement composition is placed in the well bore. In accordance with embodiments of the present invention, the spacer fluid may prevent, or at least partially reduce, intermixing of the cement composition and the drilling fluid and may facilitate the removal of filter cake and gelled drilling fluid from the walls of the well bore during displacement of the drilling fluid by the cement composition. In accordance with another embodiment, the weighted elastomer may be included in a drilling fluid. By way of example, a method may comprise using a drill bit to enlarge a well bore; and circulating a drilling fluid that comprises a weighted elastomer past the drill bit to remove cuttings.

To facilitate a better understanding of the present technique, the following examples of some specific embodiments are given. In no way should the following examples be read to limit, or to define, the scope of the invention.

EXAMPLE 1

Example weighted elastomers were prepared in accordance with a first procedure following procedure. One hundred grams of an elastomer (WELLLIFE® 665 elastomer, available from Halliburton Energy Services, Inc.) was mixed with 120 cubic centimeters of an adhesive (water-based paint) until all of the elastomer was thoroughly and evenly coated. The sample was then passed through a 16-mesh sieve to remove large pieces. Next, a sufficient amount of a weighting agent (HI-DENSE® weighting agent, available from Halliburton Energy Services, Inc.) was mixed with the sample to thoroughly and evenly coat the sample. Thereafter, the sample was passed through an 80-mesh sieve to remove excess weighting agent from the sample. The portion of the sample collected on the sieve was then dried in a vacuum overnight at 175° F. After drying, the sample was cooled to room temperature, and the specific gravity was measured using an Ultrapycnometer 1000 by Quantachrome Instruments. A portion of the dried sample was then washed with water on an 80-mesh sieve to remove any of the weighting agent that was not sufficiently adhered to the sample. Next, the sample was again dried in a vacuum overnight at 175° F. After drying, the sample was cooled to room temperature, and the specific gravity was again measured. The difference between the specific gravity after sieving and drying and the specific gravity after washing and drying was recorded. From this specific gravity change, the adherence of the weighting agent to the elastomer can be analyzed. The above procedure was repeated using an oil-based paint as the adhesive.

Additional weighted elastomers were prepared in accordance with a second procedure. Two hundred grams of a weighting agent (HI-DENSE® weighting agent, available from Halliburton Energy Services, Inc.) was mixed with 100 grams of an adhesive (oil-based primer) until all of the weighting agent was thoroughly and evenly coated. One hundred grams of an elastomer (WELLLIFE® 665 additive, available from Halliburton Energy Services, Inc.) was then mixed with the sample until a homogenous mixture was obtained. Thereafter, the sample was passed through a 16-mesh sieve to remove large pieces. Additional weighting agent was added to the sieved sample and blended until the sample was evenly coated with the weighting agent. The sample was then passed through an 80-mesh sieve to remove excess weighting agent from the sample. The sample collected on the sieve was then dried in a vacuum overnight at 175° F. After drying, the sample was cooled to room temperature, and the specific gravity was measured using an Ultrapycnometer 1000 by Quantachrome Instruments. A portion of the dried sample was then washed with water on an 80-mesh sieve to remove any of the weighting agent that was not sufficiently adhered to the sample. Next, the sample was again dried in a vacuum overnight at 175° F. After drying, the sample was cooled to room temperature, and the specific gravity was again measured. The difference between the specific gravity after sieving and drying and the specific gravity after washing and drying was recorded. From this specific gravity change, the adherence of the weighting agent to the elastomer can be analyzed.

The results of the specific gravity measurements for the three different adhesives are provided in the table below.

TABLE 1

| Adhesive | Preparation | Specific Gravity After Sieving and Drying (g/cc) | Specific Gravity After Washing and Drying (g/cc) | Specific Gravity Change |
|---|---|---|---|---|
| Water-Based Acrylic Paint | Procedure #1 | 1.8914 | 1.8175 | 0.0739 |
| Oil-Based Paint | Procedure #1 | 1.8835 | 1.8650 | 0.0185 |
| Oil-Based Primer | Procedure #2 | 2.1889 | 2.1740 | 0.0149 |

Based on the results shown in Table 1, a weighted elastomer may be prepared by attaching a weighting agent to the outer surface of the elastomer. From this table, it can also be observed that second preparation procedure using the oil-based primer resulted in a weighted elastomer with a higher specific gravity than for the first preparation procedure.

EXAMPLE 2

The following series of tests were performed to evaluate the mechanical properties of cement compositions that comprise a weighted elastomer. As set forth below, the test results demonstrate that inclusion of a weighted elastomer in the cement composition results in a set cement having properties suitable for particular cementing applications.

Sample Cement Composition No. 1 (comparative) comprised Lehigh Class A cement and 35% bwoc of SSA-1™ cement additive. SSA-1™ cement additive is silica flour available from Halliburton Energy Services, Inc. This sample composition did not include the weighted elastomer. This sample had a density of 17.28 lb/gal.

Sample Cement Composition No. 2 comprised Lehigh Class A cement, 35% bwoc of SSA-1™ cement additive, 0.5% bwoc of CFR-3™ cement friction reducer, 2% bwoc of bentonite, 8% bwoc of a weighted elastomer, and 4.56 gallons of water per 94-pound sack of cement. CFR-3™ cement friction reducer is available from Halliburton Energy Services, Inc. The weighted elastomer included in this sample composition was a weighted elastomer prepared in accordance with the second procedure of Example 1 using the oil-based primer as an adhesive. This sample had a density of 17.12 lb/gal.

Sample Cement Composition No. 3 comprised Lehigh Class A cement, 35% bwoc of SSA-1™ cement additive, 0.5% bwoc of CFR-3™ cement friction reducer, 2% bwoc of bentonite, 16% bwoc of a weighted elastomer, and 4.54 gallons of water per 94-pound sack of cement. The weighted elastomer included in this sample composition was a weighted elastomer prepared in accordance with the second procedure of Example 1 using the oil-based primer as an adhesive. This sample had a density of 17.12 lb/gal.

After the sample compositions were prepared, tests were performed to determine the compressive strength, Young's Modulus, and Poisson's ratio associated with each composition. The compressive strength tests were performed at room temperature in accordance with API Specification 10. The Young's modulus and Poisson's ratio were statically determined by means of compression testing using a load frame. The Young's modulus (or modulus of elasticity) for each sample composition was obtained by taking a ratio of a simple tension stress applied to each sample to a resulting strain parallel to the tension in that composition. The Poisson's ratio for each sample was determined by calculating a ratio of transverse strain to a corresponding axial strain resulting from uniformly distributing axial stress below a proportional limit of each sample. The Young's Modulus and Poisson's ratio were determined using ASTM D3184-02 and ASTM D2464-95a. The values determined for each sample composition are provided in the table below.

TABLE 2

| Sample Cement Composition | Weighted Elastomer (% bwoc) | Confining Pressure (psi) | 4-Day Compressive Strength (psi) | Young's Modulus | Poisson's Ratio |
|---|---|---|---|---|---|
| No. 1 | 0 | 0 | 17,221 | 3.34E+06 | 0.208 |
| No. 2 | 8 | 0 | 11,623 | 2.63E+06 | 0.217 |
| No. 3 | 16 | 0 | 8,447 | 2.30E+06 | 0.199 |

Additional tests were performed on four different samples of each of the sample cement compositions to determine the Brazilian tensile strength. The Brazilian tensile strength was determined at room temperature in accordance with ASTM D3967496-96. The density of the set cement was also determined. The values determined for each sample composition are provided in the table below.

TABLE 3

| Sample Cement Composition | Sample | Weighted Elastomer (% bwoc) | Brazilian Tensile Strength (psi) | Density (lb/gal) |
|---|---|---|---|---|
| No. 1 | A | 0 | 1,454 | 17.61 |
| No. 1 | B | 0 | 1,330 | 17.65 |
| No. 1 | C | 0 | 1,384 | 17.72 |
| No. 1 | D | 0 | 1,428 | 17.82 |
| No. 2 | A | 8 | 421 | 17.29 |
| No. 2 | B | 8 | 534 | 17.33 |
| No. 2 | C | 8 | 522 | 17.30 |
| No. 2 | D | 8 | 553 | 17.30 |
| No. 3 | A | 16 | 582 | 17.06 |
| No. 3 | B | 16 | 474 | 17.15 |
| No. 3 | C | 16 | 629 | 17.08 |
| No. 3 | D | 16 | 385 | 17.07 |

The average Brazilian tensile strengths and densities for tested samples for each of the four sample cement compositions are provided in the table below.

TABLE 4

| Sample Cement Composition | Weighted Elastomer (% bwoc) | Brazilian Tensile Strength (psi) | Density Variation |
|---|---|---|---|
| No. 1 | 0 | 1,399 | 1.2% |
| No. 2 | 8 | 508 | 0.2% |
| No. 3 | 16 | 518 | 0.5% |

Based on the results of these tests, a cement composition comprising a weighted elastomer may have properties suitable for particular applications.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing comprising:
providing a cement composition that comprises:
cement,
water, and
a weighted elastomer that comprises an elastomer and a weighting agent attached to an outer surface of the elastomer, wherein the elastomer improves elasticity of the cement composition after setting, wherein the weighting agent is attached to the outer surface of the elastomer using an adhesive, and wherein the adhesive comprises at least one adhesive selected from the group consisting of water-based acrylic paint, an oil-based paint, and an oil-based primer; and
allowing the cement composition to set.

2. The method of claim 1 wherein the cement composition is introduced into a subterranean formation and allowed to set therein.

3. The method of claim 2 wherein the cement composition is introduced into a space between a conduit and the subterranean formation and allowed to set therein.

4. The method of claim 3 comprising introducing the conduit into the subterranean formation.

5. The method of claim 1 wherein the cement composition is a heavyweight cement composition having a density of at least about 14 pounds per gallon.

6. The method of claim 1 wherein the cement comprises a hydraulic cement selected from the group consisting of a Portland cement, a pozzolana cement, a gypsum cement, a high-alumina-content cement, a slag cement, a silica cement, and combinations thereof.

7. The method of claim 1 wherein the weighted elastomer is present in an amount of about 0.1% to about 100% by dry weight of cementitious components in the cement composition.

8. The method of claim 1 wherein the elastomer comprises an elastomer selected from the group consisting of polypropylene, polyethylene, styrene divinyl benzene, polyisoprene, polybutadiene, polyisobutylene, polyurethane, a styrene-butadiene random copolymer, a styrene-butadiene block copolymer, acrylonitrile butadiene, acrylonitrile-styrene-butadiene, and combinations thereof.

9. The method of claim 1 wherein the elastomer comprises a styrene-butadiene block copolymer.

10. The method of claim 1 wherein the elastomer comprises a swellable elastomer, and wherein the weighting agent does not fully coat the swellable elastomer.

11. The method of claim 10 wherein the swellable elastomer comprises an oil swellable elastomer selected from the group consisting of natural rubber, polyurethane rubber, nitrile rubber, hydrogenated nitrile rubber, acrylate butadiene rubber, polyacrylate rubber, butyl rubber, brominated butyl rubber, chlorinated butyl rubber, chlorinated polyethylene rubber, isoprene rubber, choloroprene rubber, neoprene rubber, butadiene rubber, styrene butadiene copolymer rubber, sulphonated polyethylene, ethylene acrylate rubber, epichlorohydrin ethylene oxide copolymer rubber, ethylene-propylene-copolymer that is peroxide cross-linked, ethylene-propylene-copolymer that is sulphur cross-linked, ethylene-propylene-diene terpolymer rubber, ethylene vinyl acetate copolymer, a fluoro rubber, a fluoro silicone rubber, a silicone rubber, poly 2,2,1-bicyclo heptene (polynorbornene), alkyl-styrene, crosslinked substituted vinyl acrylate copolymer, and combinations thereof.

12. The method of claim 10 wherein the swellable elastomer comprises a water swellable elastomer selected from the group consisting of polymethacrylate, polyacrylamide, a non-soluble acrylic polymer, starch-polyacrylate acid graft copolymer and salts thereof, a polyethylene oxide polymer, a carboxymethyl cellulose type polymer, poly(acrylic acid) and salts thereof, poly(acrylic-co-acrylamide) and salts thereof, graft-poly(ethylene oxide) of poly(acrylic acid) and salts thereof, poly(2-hydroxyethyl methacrylate), poly(2-hydroxypropyl methacrylate), polyvinyl alcohol cyclic acid anhydride graft copolymer, isobutylene maleic anhydride, vinylacetate-acrylate copolymer, starch-polyacrylonitrile graft copolymer, and combinations thereof.

13. The method of claim 10 wherein the swellable elastomer is dual oil/water swellable and comprises an oil-swellable material and a water-swellable material.

14. The method of claim 1 wherein the weighting agent has a specific gravity of at least about 2 and comprises at least one material selected from the group consisting of hematite, hausmannite, barite, sand, and combinations thereof 15. The method of claim 1 wherein the weighted elastomer has a specific gravity of at least about 1.5, wherein the weighted elastomer is present in the cement composition in an amount of about 1% to about 30% by dry weight of cementitious components, and wherein a weight ratio of the weighting agent to the elastomer is about 3:1 to about 1:1.

16. The method of claim 1 wherein the weighted elastomer has a specific gravity of at least about 1.5.

17. The method of claim 1 wherein the cement composition comprises a weighting agent that is not attached to the weighted elastomer.

18. The method of claim 1 wherein the cement composition comprises an additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a dispersant, a fluid loss control additive, a defoaming agent, a foaming agent, a thixotropic additive, and combinations thereof.

19. The method of claim 1 wherein the cement composition comprises an additive selected from the group consisting of crystalline silica, amorphous silica, fumed silica, salt, fiber, hydratable clay, calcined shale, vitrified shale, a microsphere, fly ash, slag, diatomaceous earth, metakaolin, rice husk ash, natural pozzolan, zeolite, cement kiln dust, lime, a resin, latex, and combinations thereof.

20. The method of claim 1 wherein the weighted elastomer has a weight ratio of the weighting agent to the elastomer of about 3:1 to about 1:1.

21. The method of claim 1 wherein the elastomer swells at least 10% at downhole conditions upon contact with oil and/or aqueous fluids.

22. A cement composition comprising:
cement,
water, and
a weighted elastomer that comprises an elastomer and a weighting agent attached to an outer surface of the elastomer, wherein the elastomer improves elasticity of the cement composition after setting, wherein the weighting agent is attached to the outer surface of the elastomer using an adhesive, and wherein the adhesive comprises at least one adhesive selected from the group consisting of water-based acrylic paint, an oil-based paint, and an oil-based primer.

23. The cement composition of claim 22 wherein the cement composition is a heavyweight cement composition having a density of at least about 14 pounds per gallon.

24. The cement composition of claim 22 wherein the cement comprises a hydraulic cement selected from the group consisting of a Portland cement, a pozzolana cement, a gypsum cement, a high-alumina-content cement, a slag cement, a silica cement, and combinations thereof.

25. The cement composition of claim 22 wherein the weighted elastomer is present in an amount of about 0.1% to about 100% by dry weight of cementitious components in the cement composition.

26. The cement composition of claim 22 wherein the elastomer comprises an elastomer selected from the group consisting of polypropylene, polyethylene, styrene divinyl benzene, polyisoprene, polybutadiene, polyisobutylene, polyurethane, a styrene-butadiene random copolymer, a styrene-butadiene block copolymer, acrylonitrile butadiene, acrylonitrile-styrene-butadiene, and combinations thereof.

27. The cement composition of claim 22 wherein the elastomer comprises a styrene-butadiene block copolymer.

28. The cement composition of claim 22 wherein the elastomer comprises a swellable elastomer, and wherein the weighting agent does not fully coat the swellable elastomer.

29. The cement composition of claim 28 wherein the swellable elastomer comprises an oil swellable elastomer selected from the group consisting of natural rubber, polyurethane rubber, nitrile rubber, hydrogenated nitrile rubber, acrylate butadiene rubber, polyacrylate rubber, butyl rubber, brominated butyl rubber, chlorinated butyl rubber, chlorinated polyethylene rubber, isoprene rubber, choloroprene rubber, neoprene rubber, butadiene rubber, styrene butadiene copolymer rubber, sulphonated polyethylene, ethylene acrylate rubber, epichlorohydrin ethylene oxide copolymer rubber, ethylene-propylene-copolymer that is peroxide cross-linked, ethylene-propylene-copolymer that is sulfur cross-linked, ethylene-propylene-diene terpolymer rubber, ethylene vinyl acetate copolymer, a fluoro rubber, a fluoro silicone rubber, a silicone rubber, poly 2,2,1-bicyclo heptene (polynorbornene), alkylstyrene, crosslinked substituted vinyl acrylate copolymer, and combinations thereof.

30. The cement composition of claim 28 wherein the swellable elastomer comprises a water swellable elastomer selected from the group consisting of polymethacrylate, polyacrylamide, a non-soluble acrylic polymer, starch-polyacrylate acid graft copolymer and salts thereof, a polyethylene oxide polymer, a carboxymethyl cellulose type polymer, poly (acrylic acid) and salts thereof, poly(acrylic-co-acrylamide) and salts thereof, graft-poly(ethylene oxide) of poly(acrylic acid) and salts thereof, poly(2-hydroxyethyl methacrylate), poly(2-hydroxypropyl methacrylate), polyvinyl alcohol cyclic acid anhydride graft copolymer, isobutylene maleic anhydride, vinylacetate-acrylate copolymer, starch-polyacrylonitrile graft copolymer, and combinations thereof.

31. The cement composition of claim 28 wherein the swellable elastomer is dual oil/water swellable and comprises an oil-swellable material and a water-swellable material.

32. The cement composition of claim 22 wherein the weighting agent has a specific gravity of at least about 2 and comprises at least one material selected from the group consisting of hematite, hausmannite, barite, sand, and combinations thereof.

33. The cement composition of claim 22 wherein the weighted elastomer has a specific gravity of at least about 1.5, wherein the weighted elastomer is present in the cement composition in an amount of about 1% to about 30% by dry weight of cementitious components, and wherein a weight ratio of the weighting agent to the elastomer is about 3:1 to about 1:1.

34. The cement composition of claim 22 wherein the weighted elastomer has a specific gravity of at least about 1.5.

35. The cement composition of claim 22 wherein the cement composition comprises a weighting agent that is not attached to the weighted elastomer.

36. The cement composition of claim 22 wherein the cement composition comprises an additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a dispersant, a fluid loss control additive, a defoaming agent, a foaming agent, a thixotropic additive, and combinations thereof.

37. The cement composition of claim 22 wherein the cement composition comprises an additive selected from the group consisting of crystalline silica, amorphous silica, fumed silica, salt, fiber, hydratable clay, calcined shale, vitrified shale, a microsphere, fly ash, slag, diatomaceous earth, metakaolin, rice husk ash, natural pozzolan, zeolite, cement kiln dust, lime, a resin, latex, and combinations thereof.

38. The cement composition of claim 22 wherein the weighted elastomer has a weight ratio of the weighting agent to the elastomer of about 3:1 to about 1:1.

* * * * *